United States Patent [19]
Miura et al.

[11] 3,762,162
[45] Oct. 2, 1973

[54] METHOD OF OPERATING AND CONTROL SYSTEM FOR COMBINED CYCLE PLANTS

[75] Inventors: Kiyoshi Miura, Ibaraki-ken; Yoshiyuki Nakano; Koichi Kawatake, both of Hitachi-shi, all of Japan

[73] Assignee: Hitachi Ltd., Tokyo, Japan

[22] Filed: May 16, 1972

[21] Appl. No.: 253,836

[52] U.S. Cl. ............ 60/49, 60/39.18 R, 60/39.18 B, 60/6
[51] Int. Cl. ............................................. F01k 23/00
[58] Field of Search ............... 60/39.18 R, 39.18 A, 60/39.18 B, 39.18 C, 6, 38, 49, 105; 290/2, 4, 40

[56] References Cited
UNITED STATES PATENTS

| | | | |
|---|---|---|---|
| 2,949,731 | 8/1960 | Hambling | 290/2 X |
| 2,953,691 | 9/1960 | Rapp | 290/40 X |
| 3,458,710 | 7/1969 | Dodge | 290/4 |
| 3,635,019 | 1/1972 | Kronogard | 60/39.18 R |

Primary Examiner—Martin P. Schwadron
Assistant Examiner—Allen M. Ostrager
Attorney—Paul M. Craig, Jr. et al.

[57] ABSTRACT

In order to improve the efficiency of a heat power plant there are proposed combined cycle plants combining a gas turbine plant and a steam turbine plant as a couple. To improve transient response characteristics and ensure steady normal operation of such combined cycle plants, quick response of the gas turbine plant is effectively utilized. The output capacity of gas turbine plants, though it has been increased in recent years, is still far small compared to steam turbine plants. However, the response of gas turbines to a change of load command is far superior to the steam turbines. Accordingly, when the load command changes a gas turbine plant is adapted to off-set the delay in response of steam turbine plant and the shares are subsequently corrected, thereby improving transient response characteristic and ensuring steady normal operation of the whole combined cycle plant.

11 Claims, 11 Drawing Figures

METHOD OF OPERATING AND CONTROL SYSTEM FOR COMBINED CYCLE PLANTS

BACKGROUND OF THE INVENTION

1. Field of the Invention

This invention relates to a method of operating and control system for combined cycle plants.

2. Description of the Prior Art

In recent thermal power generating units, there are growing trends for high temperature, high tension and high capacity. In these heat power plants the efficiency of power generation is almost at the upper limit.

Efforts have long been devoted to improve the power generation efficiency, and a combined cycle combing two different kinds of fluid has been considered to be one of the most effective methods.

To date, large capacity units have been developed with improvement of the reliability of gas turbines, and steam-gas combined cycle power generating systems are now in the limelight as promising high efficiency power plants.

The steam-gas combined cycle systems are classed into several types, and the generally adopted one is the exhaust gas re-combustion type combined cycle. Since the gas turbine can be quickly started and stopped, it can be extensively utilized for emergency power source and peak load time purposes. Although the combined cycle is aimed at increasing the plant efficiency in regard of the basic load, it is convenient to have method of operating and control system for combined cycle plants making effective use of the quick response character of the gas turbine so that the response of the whole plant to a change in load demand signal may be improved without affecting other characteristics such as capacity ratio of the plant.

SUMMARY OF THE INVENTION

An object of the invention is to provide method of operating and control system for combined cycle plants, which make effective use of one or more sub-plants capable of quickly responding to a change in the load demand signal such as gas turbine plant for providing improved transient response characteristic of the whole plant, while at the same time ensuring sufficiently steady and safe normal operation by appropriately setting the output shares for the individual sub-plants.

Another object of the invention is to provide a control system for combining cycle plants, in which load shares of gas turbine and steam turbine units with respect to a change in the load demand signal are determined on the basis of the response characteristics of these units, and they are eventually converted to a predetermined output ratio, for instance the rated output ratio, of these units as the normal operation state of the plant sets in.

A further object of the invention is to provide a control system for combined cycle plants, in which the gas turbine unit output in the normal operation state is set to a predetermined value so as to make full use of the response characteristic of the gas turbine to imaginable changes in the load demand signal.

DETAILED DESCRIPTION OF THE PREFERRED EMBODIMENTS

Figure 1:
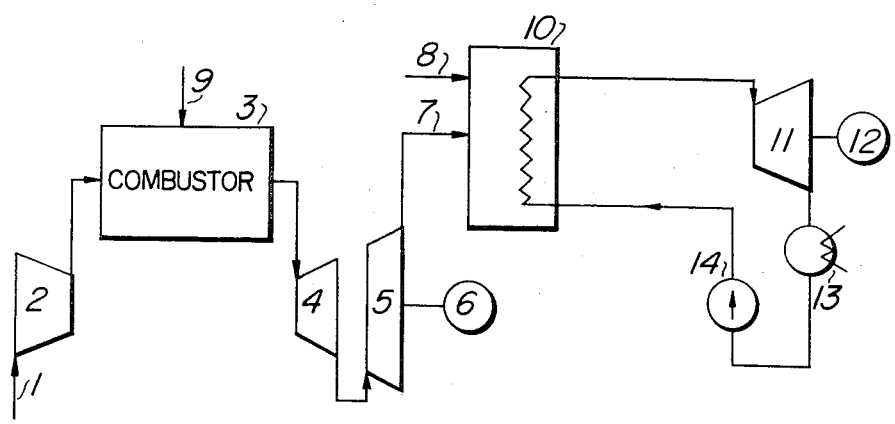
FIG. 1 is a schematic representation of an exhaust gas re-combustion type combined cycle system consisting of a gas turbine unit and a steam turbine unit.

FIG. 1 show an exhaust gas re-combustion type combined cycle system.

In the Figure, reference numeral 1 designates a compressor air supply system, numeral 2 a compressor, numeral 3 a combustor, numeral 4 a high pressure turbine, numeral 5 a low pressure turbine, numeral 6 a generator, numeral 7 gas turbine exhaust gas led to a boiler 10 for effectively utilizing the exhaust heat, numeral 8 boiler fuel supply, numeral 9 gas turbine fuel supply, numeral 11 a steam turbine, numeral 12 an a–c generator coupled to the steam turbine 11, numeral 13 a condenser, and numeral 14 a water supply pump.

In this system, the coupling of gas turbine unit and steam turbine unit is done as the gas turbine exhaust gas is led to the boiler, whereby high temperature exhaust gas (at temperatures of 300° to 500 °C) is effectively utilized.

Figure 2:
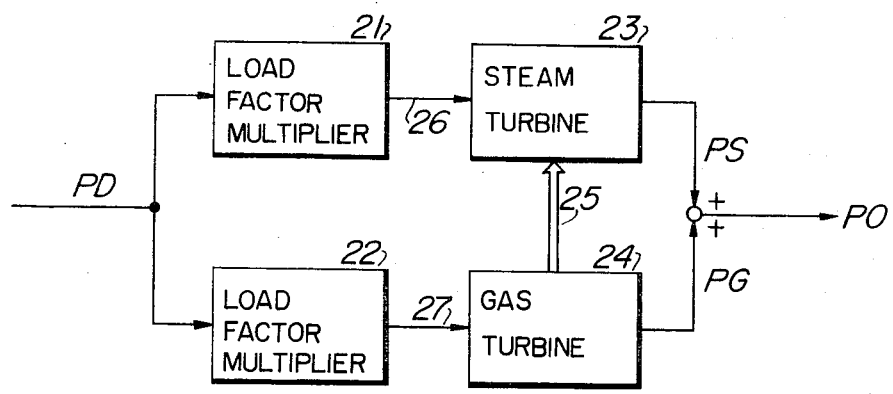
FIG. 2 is a block diagram showing the way of alloting shares of load demand input to respective sub-plants.

FIG. 2 shows the power demand signal system for the plant of FIG. 1. Power demand signal labeled PD is coupled through load factor multipliers 21 and 22 and signal lines 26 and 27 to steam and gas turbines 23 and 24 as respective output commands. Numeral 25 designates the gas turbine exhaust gas, and characters PS and PG designate steam turbine subplant output and gas turbine sub-plant output respectively. The combined cycle plant output is $PO = PS + PG$.

Figure 3:
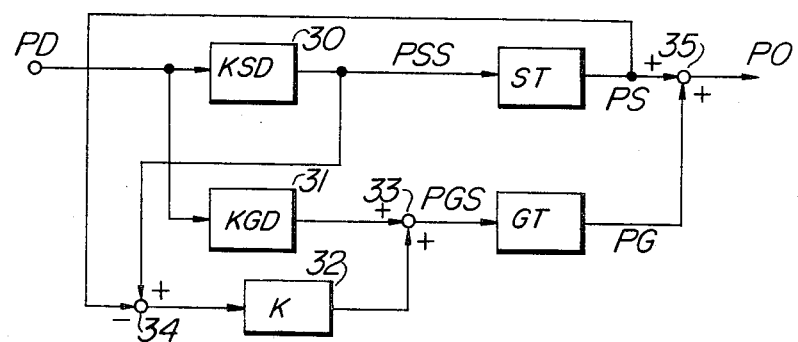
FIG. 3 is a block diagram showing a control system for producing output commands for individual sub-plants in a combined cycle plant embodying the invention.

FIG. 3 shows an embodiment of the control system according to the invention. Numerals 30 and 31 designate coefficient multipliers for steam turbine and gas turbine sub-plants respectively. They multiply the power demand input PD by their respective coefficients KSD and KGD. Numeral 32 designates a further coefficient multiplier, which multiplies its output by its coefficient K. Numerals 33 to 35 designate adders for adding respective inputs in the shown polarities. Characters ST and GT respectively designate a steam turbine sub-plant and a gas turbine sub-plant, which are controlled by respective control means not shown but each consisting of a closed loop including a proportional integrating element such that their respective outputs are rendered equal to the respective settings PSS and PGS.

The power demand signal PD coupled to both the coefficient multipliers 30 and 31 is multiplied by their respective coefficients KSD and KGD to produce respective first output command signals, providing for the respective settings PSS and PGS for the sub-plants ST and GT. The output of the multiplier 31 is combined with the output of the adder 34 to provide the setting PGS. The output of the multiplier 30 constitutes a positive input to the adder 34, while the actual output PS of the sub-plant ST is negatively coupled to the adder 34. The adder 34 thus provides output for a time from an instant of occurrence of a change of the power demand signal level PD until the output PS of the sub-plant ST following the change becomes equal to the setting PSS. During this time, the setting PGS for the gas turbine sub-plant GT is increased or reduced from the power demand share output of the multiplier 31 by an amount equal to the output of the adder 34, so that the response of the sub-plant GT, and hence the response of the whole plant, to the change in the power demand signal may be improved that much. This effect may be intensified or weakened by appropriately controlling the coefficient K of the multiplier 32.

Figure 4:
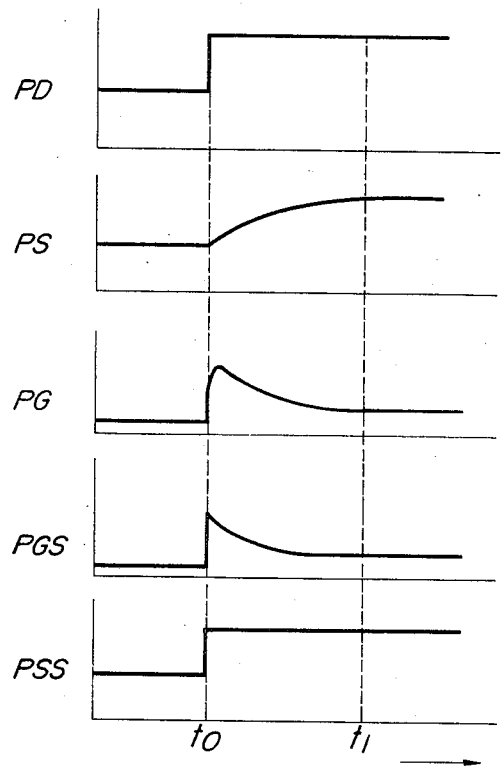
FIG. 4 is a time chart showing output waveforms at various parts of the system of FIG. 3.

FIG. 4 shows waveforms of outputs of various parts of the system described above. In the Figure, like outputs are labeled by like characters as in FIG. 4. In the illustrated case, $PO = PD(KSD + KGD)$ is satisfied in the normal operation state and change in PD is solely borne by the gas turbine sub-plant. The coefficients are selected to be $KGD = 0.2$, $KSD = 0.8$ and $K = 1$. As is shown, PGS changes with time while PSS does not, and it becomes equal to $PD \cdot KGD$ as normal steady state sets in again, that is, at instant $t_1$ a transient time after instant $t_0$ of occurrence of a change in the power demand signal PD.

Figure 5:
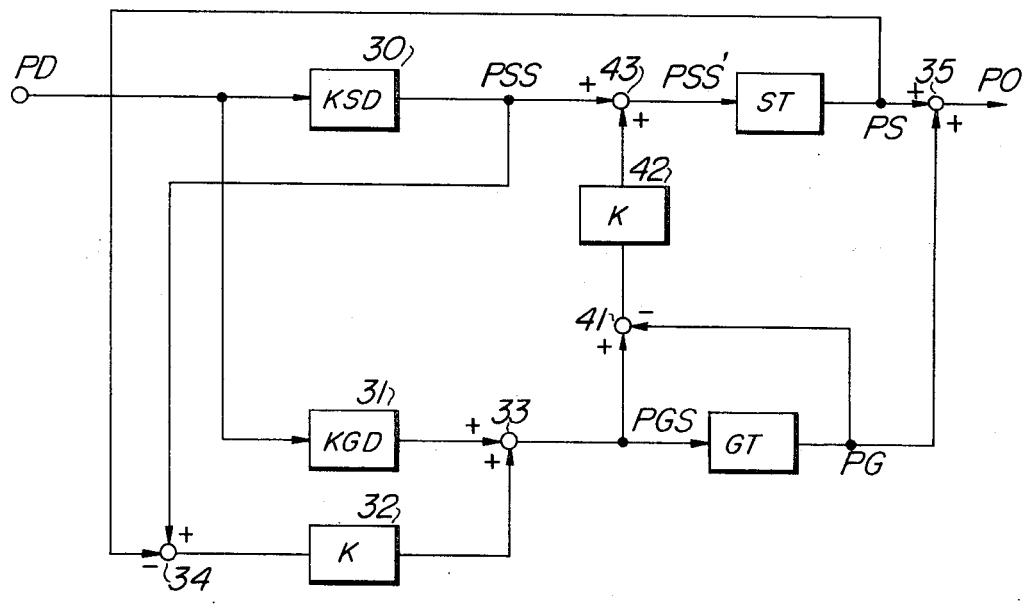
FIGS. 5 to 8 are block diagrams of other embodiments of the control system according to the invention.

FIG. 5 shows another embodiment, in which an output command signal modifying means similar to that for the gas turbine sub-plant is also provided for the steam turbine sub-plant ST to promote the effect of bettering the plant response at the transient time. More particularly, in this embodiment the difference between the output command setting for and actual output of the gas turbine sub-plant GT is derived from an adder 41 and multiplied by K in a multiplier 42, whose output is added to the output PSS of multiplier 30 in an adder 42 to provide output command signal PSS' for the steam turbine sub-plant ST.

Figure 6:
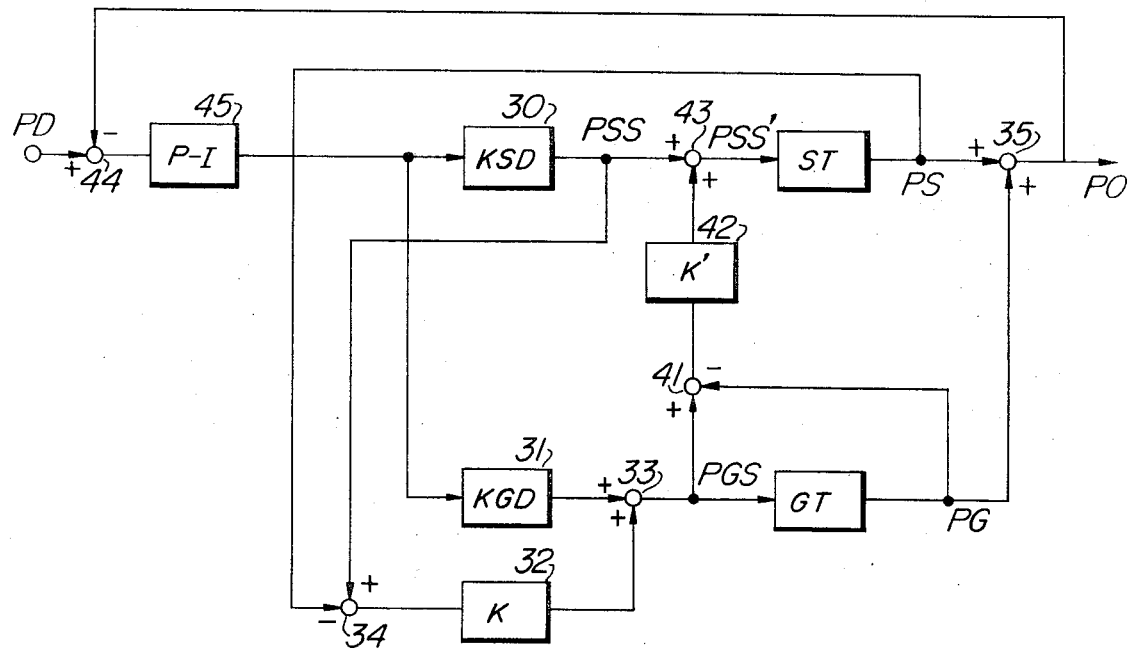

FIG. 6 shows a further embodiment, which is essentially the same as the previous embodiment of FIG. 5 or FIG. 3 except that the difference between the power demand signal PD for and the actual output PO of the whole plant is derived from an adder 44 and coupled through a proportional integrating unit (P-I) 45 to the multipliers 30 and 31, so as to completely reduce the difference between PD and PO to zero.

As has been shown, according to the invention it is possible to improve the plant response by a simple method. However, the preceding embodiments are not fully satisfactory in certain separate aspects.

Figure 9A:
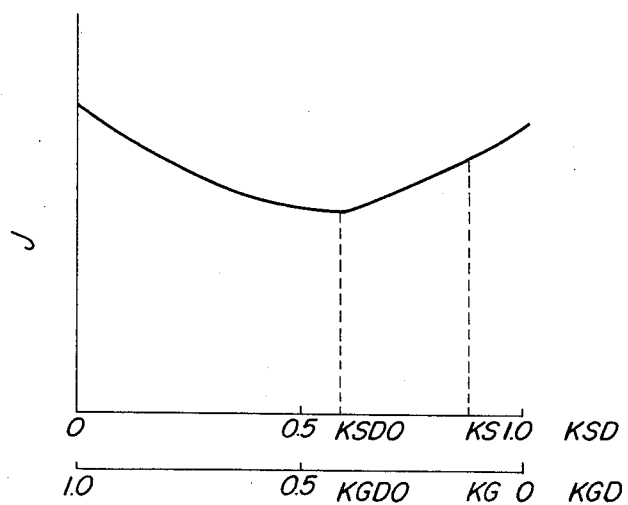
FIGS. 9a and 9b show graphs illustrating the response of combined cycle plants controlled in accordance with the invention.
Figure 9B:
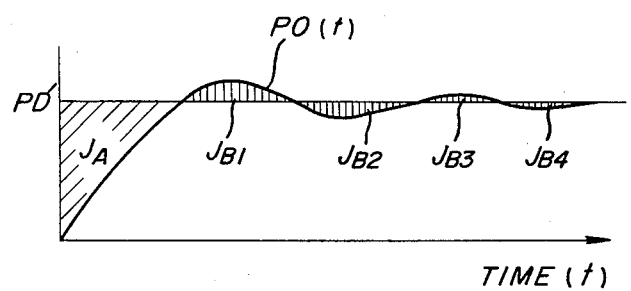

For example, FIG. 9a shows values of a plant response evaluating function J for various values of KSD and KGD satisfying a relation $KSD + KGD = 1.0$, with PSS and PGS derived in the system of FIG. 3. In the Figure, the abscissa is taken for the coefficient KSD or KGD and the ordinate represents the function J, which is defined as $$J = \int |PD' - PO(t)| dt$$

with respect to FIG. 9b.

By representing the difference between the change PD' in the power damand signal and the corresponding output response PO(t) in terms of JA, JB1, JB2, . . . , we have $$J = JA + \sum_{i=1}^{4} JBi$$

As is seen the plant response characteristic is evaluated in terms of the time integral of the absolute value of the difference between the power demand signal change PD' and the corresponding plant output response PO(t). As is seen from FIG. 9a, there are certain values $KSD_0$ and $KGD_0$ of the respective coefficients KSD and KGD, at which the function J is minimum. If these values coincide with the load sharing coefficient values at the time of the normal steady operation, no problem will arise. In practice, however, the former values would frequently differ from the latter. For example, the rated load sharing coefficients are often KS and KG.

Although it is possible to have $KSD_0$ and $KGD_0$ respective coincide with KS and KG for comparatively small-scale combined cycle plants, it is hardly feasible since the gas turbine is usually standardized and there is a trend of increasing the capacity of steam turbines. The afore-described systems are therefore not fully satisfactory from the standpoint of the possibility of providing improved response characteristics even where $KSD_0$ and $KGD_0$ respectively differ from KS and KG and nevertheless running the whole plant with an optimum load sharing ratio in the normal steady running state.

Figure 7:
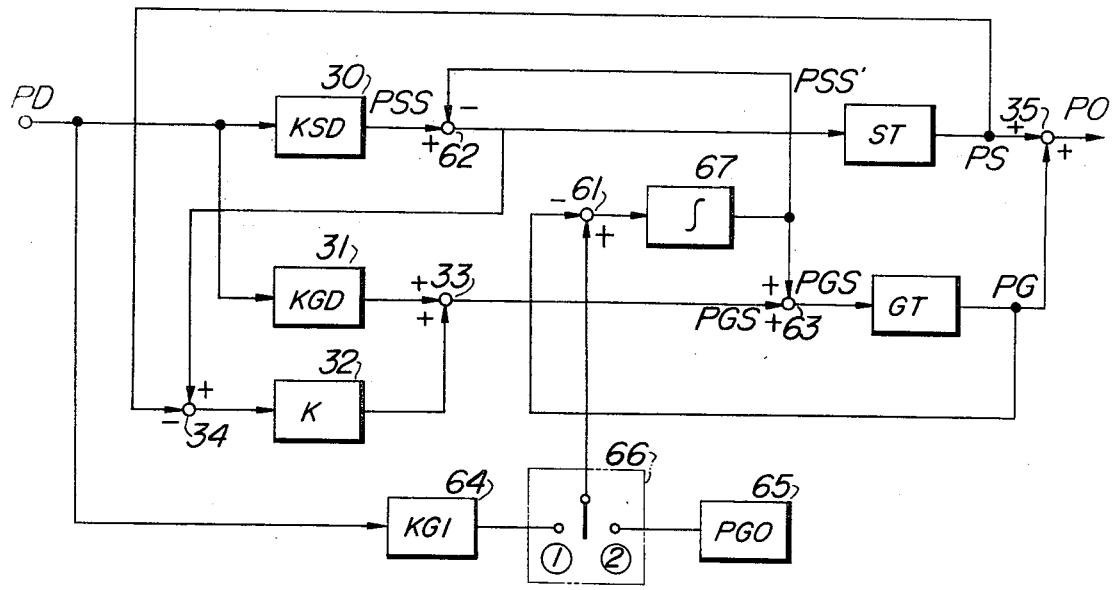
Figure 8:
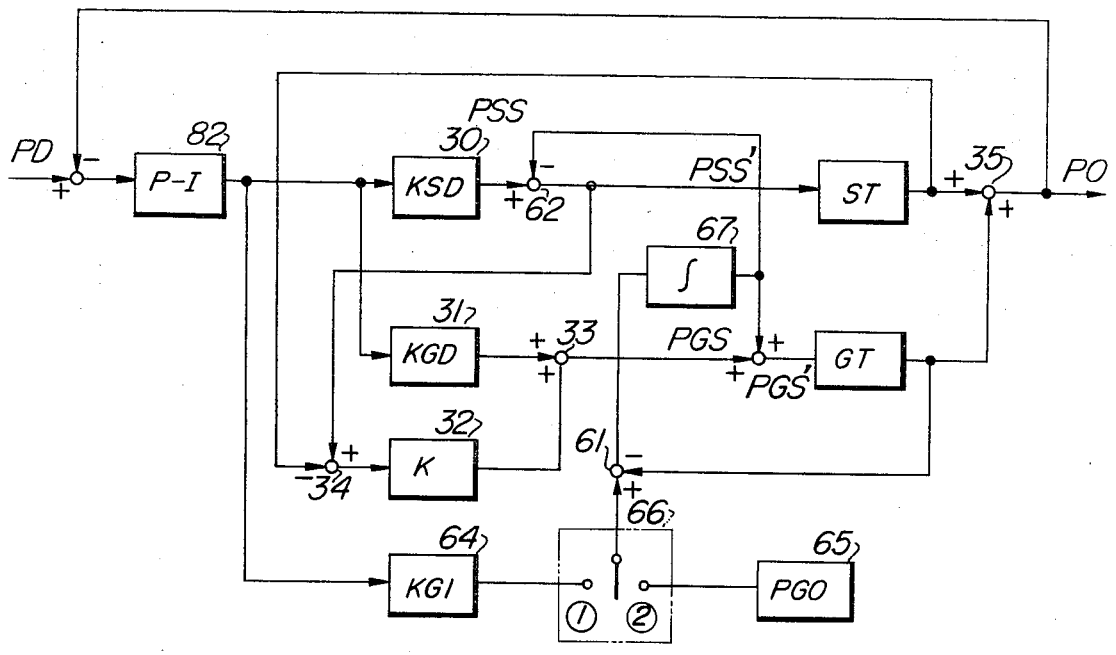

FIGS. 7 and 8 show still further embodiments, in which the above discussed points are taken care of.

Referring to FIG. 7, the same or equivalent parts to these shown in FIG. 3 are designated by like reference symbols. This embodiment includes adders 61 to 63. Numeral 64 designates a coefficient multiplier, whose coefficient is set to KGI such that its output voltage when the power demand signal PD is at the rated output level corresponds to KG times the rated output level of the gas turbine subplant GT. Numeral 65 designates a constant voltage generator to generate a constant voltage PGO corresponding to, for instance, 50 percent of the rated output of the gas turbine sub-plant GT. Numeral 66 designates a switch, whose pole may be freely switched to either side (1) or (2). Numeral 67 designates an integrating circuit having a sufficiently large time constant, for instance $t_2 - t_1 > 10(t_1 - t_0)$ as will be understood from the latter description in connection with the time chart of FIG. 10. The difference between the output of either multiplier 64 or constant voltage generator 65 selected by the switch 66 and the actual output of the gas turbine sub-plant GT is fed to the integrator 67. The output of the integrator 67 constitutes a negative input to the adder 62, which combines this input with the output PSS of the multiplier 30 to provide a corrected output command signal PSS' to the steam turbine subplant ST. The integrator output also constitutes a positive input to the adder 62, which combines this input with the output PGS of the multiplier 31 to provide a corrected output command signal PGS' to the gas turbine sub-plant GT. In the above manner, the outputs of the multipliers 30 and 31 sharing the power demand signal PD are corrected by the output of the integrator 67. Thus, the correcting function continues until the input to the integrator 67 becomes zero, that is, until the output of the gas turbine sub-plant GT just offsets the output of the switch 66.

It is a feature of this embodiment that a change in the power demand signal is responded in the form of corresponding changes in the shares of $KSD_0$ and $KGD_0$, which are subsequently changed to a predetermined or desired output ratio through the correction provided by the integrator 67.

Figure 10:
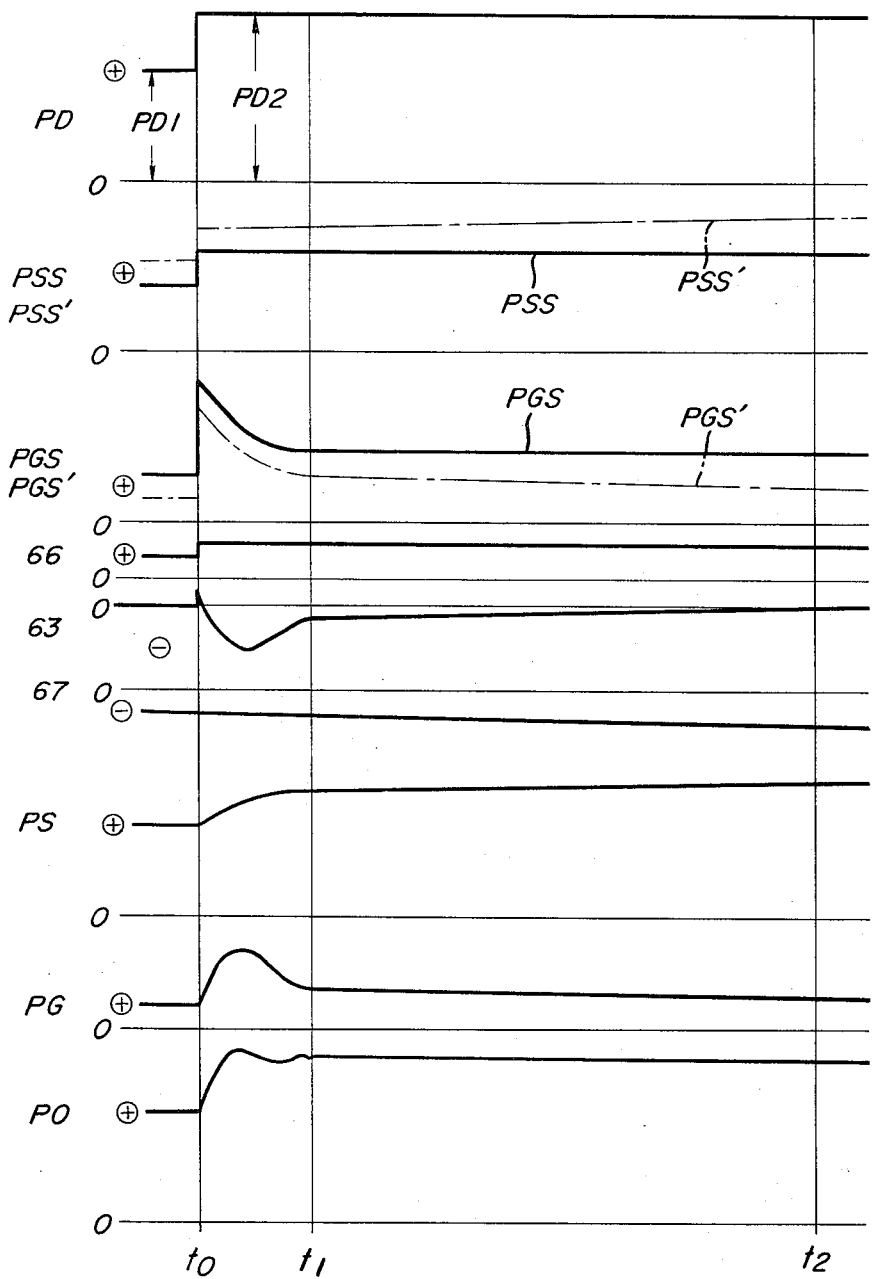
FIG. 10 is a time chart showing output waveforms at various parts of the systems of FIGS. 7 and 8.

The operation of this embodiment will now be described in connection with the time chart of FIG. 10. In this Figure, similar to FIG. 4, the abscissa is commonly taken for time $t$. $t_0$ corresponds to an instant of occurrence of a change in the power demand signal level, $t_1$ corresponds to an instant of termination of the transient plant response to the power demand change, and $t_2$ corresponds to an instant of termination of the correction featured by this embodiment. The instants $t_0$ and $t_1$ are the same as those shown in FIG. 4. It will be seen from FIG. 10 that the evaluation method described earlier in connection with FIGS. 9a and 9b may be employed to obtain an optimum response characteristic. Meanwhile, the output of the integrator 67 continues to change until the output of the adder 63 becomes zero. Thus, the commands for the sub-plants ST and GT are corrected by this output as shown at $PSS'$ and $PGS'$, and after time $t_2$ the load shares for $ST$ and $GT$ can be rendered steady at a ratio $KS : KG$.

When the switch 66 is thrown to the side (2), its output is constant irrespective of the level of the power demand signal $PD$. Thus, the operation at this time is the same as when the switch 66 is thrown to the side (1) except that the output of the gas turbine sub-plant GT ultimately assumes a constant value corresponding to the voltage of the generator 65.

The FIG. 8 embodiment is essentially the same as the preceding FIG. 7 embodiment except for an adder 81 and a proportional integrating unit (P-I) 82. In this embodiment, the difference between the power demand signal $PD$ for and actual output $PO$ of the whole plant is derived from the adder 81 and coupled through the proportional integrating unit 82 to the multipliers 30 and 31. By so doing, since there is no possibility of offsetting the whole plant, it is possible to obtain plant output PO faithfully following the power demand signal even where the sub-plants ST and GT are mere proportional elements.

As has been described in the foregoing, according to the invention it is possible to share the power demand in such a manner as to provide the best plant response to a change in the power demand, while permitting the correction of the shares for operating the plant after the setting of the transient plant response at desired share ratios. Besides, since the correction can be gradually done through an integrating circuit having a large time constant, it never results in any disturbance of the plant at all.

Thus, the invention may be applied to combined cycle plants including sub-plants differently responsible to a change in the power demand signal. For example, it may be applied to where a penetrating flow type boiler plant and a drum type boiler plant are combined, where a heat power plant and atomic power plant are combined, where water power plant and a heat power plant are combined, and for any other combined cycle plant. It may also be applied where individual sub-plants are located at places remote from one another.

The foregoing embodiments are by no means limitative, but various changes and modifications in the construction and mode of operation are possible, such as in the following:

1. The correction through the integrator 67 provides the same effects if it is done with respect to the output of the steam turbine ST instead of the gas turbine GT.

2. The adders 33 and 34 and coefficient multiplier 32 may be omitted. In this case, the $KSD_0$ and $KGD_0$ described in connection with FIG. 9a will be considerably different compared to the case of the FIG. 7 and FIG. 8 embodiments, but this would give rise to no particular problem.

3. If the gas turbine sub-plant GT in the embodiment of FIG. 7 or 8 is operated to provide output corresponding to the voltage of the constant voltage generator 65, that is, to provide a constant output irrespective of the power demand signal PD, the response of the whole plate may be improved by so arranging as to provide, for instance, 20 percent of the rated output for periods when the power demand is on the increasing trend and 80 percent of the rated output for periods when the power demand is on the decreasing trend.

The adder, coefficient multiplier or integrating circuit constituting the component element of the conrol system of FIGS. 6 and 8 may be realized as electronic circuit, for instance, by suitably combining operational amplifier, potentiometer, capacitor and other elements.

We claim:

1. A method of controlling a combined cycle power plant consisting of at least two subplants of different types, at least one of said sub-plants being operated by a control signal produced from a first output command signal obtained in a predetermined proportion to a power demand signal and a second output command signal obtained from a signal representing the actual output signal of another one of said sub-plants and said power command signal.

2. A system for controlling a combined cycle power plant consisting of at least two subplants of different types, which comprises:
input means to introduce a power demand signal specifying the output of said combined cycle plant;
a plurality of percentage coefficient multiplier means to multiply said power demand signal by respective predetermined percentage coefficients for producing first output command signals for the individual sub-plants;
output command signal correction means to produce a second output command signal by multiplying the difference between the first output command signal for a sub-plant having a large characteristic time constant of transient response and a signal representing the actual output of said last-mentioned sub-plant by a predetermined coefficient; and
adder means to add the output of the coefficient multiplier means for said last-mentioned sub-plant and the output of said output command signal correction means;
the output of said coefficient multiplier means for said last-mentioned sub-plant being used to control said last-mentioned sub-plant, and the output of said adder means being used to control a sub-plant having a small characteristic transient response time constant.

3. The system for controlling a combined cycle power plant according to claim 2, which further comprises output command signal correction means for the sub-plant having a large characteristic transient response time constant, the output of said last-mentioned output command signal correction means constituting an input to adder means providing an output used to control the sub-plant having a large characteristic transient response time constant.

4. The system for controlling a combined cycle power plant according to claim 3, wherein said output command signal correction means for the small characteristic time constant sub-plant receives the output of the adder means for controlling the large characteristic time constant sub-plant in place of the pertinent first output command signal.

5. A method of controlling a combined cycle power plant consisting of at least two sub-plants of different types, each of sub-plants being operated by a control signal produced from a first output command signal obtained in a predetermined proportion to a power demand signal and a second output command signal obtained from an integrating circuit having a sufficiently large time constant, said integrating circuit receiving the difference between a signal representing the actual output of one of said sub-plants and a signal obtained by multiplying said power demand signal by a predetermined factor.

6. A system for controlling a combined cycle power plant consisting of at least two sub-plants of different types, which comprises:
  input means to introduce a power demand signal specifying the output of said combined cycle plant;
  a plurality of percentage coefficient multiplier means to multiply said power demand signal by respective predetermined percentage coefficients for producing first output command signals for the individual sub-plants;
  a multiplier means to multiply said power demand signal by a predetermined factor;
  an adder means to derive the difference between a signal representing the actual output of a sub-plant having a small characteristic transient response time constant and the output of said multiplier means;
  an output command signal correction means receiving the output or said adder means and consisting of an integrating circuit having a time constant at least as large as the time constant of a large characteristic transient response time constant sub-plant; and
  correction adder means to derive second output command signals from the output of said respective percentage coefficient multipliers and the output of said output command signal correction means;
  the output of said individual sub-plants being substantially determined by the output of the respective percentage coefficient multiplier means at an initial stage of change in the power demand signal and being adapted to change in course of time in accordance with the output of said output command signal correction means.

7. The system for controlling a combined cycle power plant according to claim 6, which further comprises a signal generating means to produce a third constant output command signal for use in place of the output of said multiplier means to multiply said power demand signal by a predetermined factor.

8. The system for controlling a combined cycle power plant according to claim 7, wherein said multiplier means and said signal generating means are adapted to be selectively used.

9. The system for controlling a combined cycle power plant according to Claim 6, which further comprises a second adder means to derive the difference between a signal representing the actual output of a sub-plant having a large characteristic transient response time constant and the output of the adder means for controlling said last-mentioned sub-plant, a second multiplier means to multiply the output of said second adder means by a predetermined factor, and a third adder means to derive the sum of the first output comand signal for a sub-plant having a small characteristic transient response time constant and the output of said second mutliplier means.

10. The system for controlling a combined cycle power plant according to claim 2, which further comprises an input adjuster means having an integrating function, said input adjuster means receiving the difference between said power demand signal and a signal representing the output of said combined cycle plant, the output of said input adjuster means being supplied to said input means.

11. The system for controlling a combined cycle power plant according to claim 6, which furthere comprises an input adjuster means having an integrating function, said input adjuster means receiving the difference between said power demand signal and a signal representing the output of said combined cycle plant, the output of said input adjuster means being supplied to said input means.

* * * * *

UNITED STATES PATENT OFFICE
CERTIFICATE OF CORRECTION

Patent No. 3,762,162  Dated  October 2, 1973

Inventor(s) Kiyoshi Miura, Yoshiyuki Nakano and Koichi Kawatake

It is certified that error appears in the above-identified patent and that said Letters Patent are hereby corrected as shown below:

Title Page, insert the following:

[30]  Foreign Application Priority Data

May 17, 1971    Japan ........... 32512/71

Signed and sealed this 23rd day of April 1974.

(SEAL)
Attest:

EDWARD M.FLETCHER,JR.
Attesting Officer

C. MARSHALL DANN
Commissioner of Patents